(12) United States Patent
Takeda et al.

(10) Patent No.: US 11,646,853 B2
(45) Date of Patent: May 9, 2023

(54) TRANSMITTING APPARATUS, RECEIVING APPARATUS AND RADIO COMMUNICATION METHOD

(71) Applicant: NTT DOCOMO, INC., Tokyo (JP)

(72) Inventors: Kazuki Takeda, Tokyo (JP); Keisuke Saito, Tokyo (JP); Kazuaki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/629,748

(22) PCT Filed: Jul. 13, 2017

(86) PCT No.: PCT/JP2017/025612
§ 371 (c)(1),
(2) Date: Jan. 9, 2020

(87) PCT Pub. No.: WO2019/012669
PCT Pub. Date: Jan. 17, 2019

(65) Prior Publication Data
US 2020/0235894 A1     Jul. 23, 2020

(51) Int. Cl.
*H04B 7/0456* (2017.01)
*H04L 5/00* (2006.01)
*H04W 72/23* (2023.01)

(52) U.S. Cl.
CPC ......... *H04L 5/0092* (2013.01); *H04B 7/0456* (2013.01); *H04L 5/0041* (2013.01); *H04W 72/23* (2023.01)

(58) Field of Classification Search
CPC ..... H04L 5/0041; H04L 5/0051; H04L 27/26; H04L 5/0039; H04W 72/042; H04B 7/0456
See application file for complete search history.

(56) References Cited

U.S. PATENT DOCUMENTS 10,070,456 B1 * 9/2018 Marupaduga ......... H04L 5/0039
10,721,038 B2 * 7/2020 Kwak ................. H04L 25/0228
(Continued)

FOREIGN PATENT DOCUMENTS

CN          103220795 A      7/2013
JP          2015-508603 A    3/2015
(Continued)

OTHER PUBLICATIONS

International Search Report issued in PCT/JP2017/025612 dated Sep. 26, 2017 (2 pages).
(Continued)

*Primary Examiner* — Syed Ali
(74) *Attorney, Agent, or Firm* — Osha Bergman Watanabe & Burton LLP

(57) ABSTRACT

A terminal is disclosed including a receiver that receives downlink control information indicating a transmission bandwidth allocated to a downlink shared channel within a bandwidth part, and a processor that determines a size of a precoding resource block group (PRG), to which a same precoding is applied, based on the transmission bandwidth or a subset of the transmission bandwidth. In other aspects, a radio communication method for a terminal is also disclosed.

4 Claims, 13 Drawing Sheets

(56) References Cited

U.S. PATENT DOCUMENTS

| | | | |
|---|---|---|---|
| 2013/0163507 A1 | 6/2013 | Hoshino et al. | |
| 2014/0321399 A1 | 10/2014 | Liu et al. | |
| 2015/0146681 A1* | 5/2015 | Liu | H04L 27/2613 370/330 |
| 2016/0227520 A1* | 8/2016 | Davydov | H04L 5/00 |
| 2016/0373229 A1* | 12/2016 | You | H04L 1/0026 |
| 2017/0064705 A1 | 3/2017 | Lee et al. | |
| 2017/0201967 A1* | 7/2017 | Yang | H04W 72/0446 |
| 2017/0332409 A1* | 11/2017 | Yerramalli | H04L 1/00 |
| 2018/0054788 A1* | 2/2018 | Kwon | H04L 27/261 |
| 2018/0092002 A1* | 3/2018 | Manolakos | H04W 72/12 |
| 2018/0097663 A1* | 4/2018 | Jiang | H04L 5/00 |
| 2018/0102817 A1* | 4/2018 | Park | H04B 7/04 |
| 2018/0205512 A1* | 7/2018 | You | H04L 5/0048 |
| 2018/0324018 A1* | 11/2018 | Hosseini | H04L 27/2602 |
| 2019/0190572 A1* | 6/2019 | Osawa | H04B 7/0413 |
| 2019/0190643 A1* | 6/2019 | Lee | H04L 1/001 |
| 2019/0190669 A1* | 6/2019 | Park | H04W 72/0413 |
| 2020/0015275 A1* | 1/2020 | Kim | H04J 11/00 |
| 2020/0052939 A1* | 2/2020 | Xiong | H04L 5/0026 |
| 2020/0252954 A1* | 8/2020 | Kim | H04L 1/0031 |
| 2020/0260526 A1* | 8/2020 | Xiong | H04W 76/11 |

FOREIGN PATENT DOCUMENTS

| | | | | |
|---|---|---|---|---|
| JP | 2017-513262 A | 5/2017 | | |
| WO | 2012/114666 A1 | 8/2012 | | |
| WO | 2017/038892 A1 | 3/2017 | | |
| WO | WO-2017038892 A1 * | 3/2017 | | H04L 5/0048 |

OTHER PUBLICATIONS

Written Opinion of the International Searching Authority issued in PCT/JP2017/025612 dated Sep. 26, 2017 (4 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

3GPP TSG RAN WG1 Meeting #80bis; R1-151831 "On PRB bundling enhancements for FD-MIMO systems" Intel Corporation; Belgrade, Serbia; Apr. 20-24, 2015 (4 pages).

3GPP TSG RAN WG1 Meeting #88; R1-1701735 "Discussion on sPDSCH design" Huawei, HiSilicon; Athens, Greece; Feb. 13-17, 2017 (6 pages).

3GPP TSG-RAN WG1 NR Ad-Hoc; R1-1700798 "Discussion on PRB bundling" Qualcomm Incorporated; Spokane, Washington, USA; Jan. 16-20, 2017 (8 pages).

Extended European Search Report issued in European Application No. 17917695.3, dated Jan. 18, 2021 (9 pages).

Office Action in counterpart Chinese Patent Application No. 201780093117.0 dated Feb. 15, 2022 (12 pages).

Office Action in counterpart Indian Patent Application No. 202037000887 dated Mar. 1, 2022 (6 pages).

Office Action in counterpart Chinese Patent Application No. 201780093117.0 dated Sep. 15, 2022 (14 pages).

Office Action in counterpart Israeli Patent Application No. 271945 dated Aug. 15, 2022 (8 pages).

Office Action in counterpart Japanese Patent Application No. 2019-529407 dated Sep. 14, 2021 (9 pages).

Vivo; "Discussion on downlink RA"; 3GPP TSG RAN WG1 NR Ad-Hoc#2, R1-1710392; Qingdao, P.R. China; Jun. 27-30, 2017 (4 pages).

\* cited by examiner

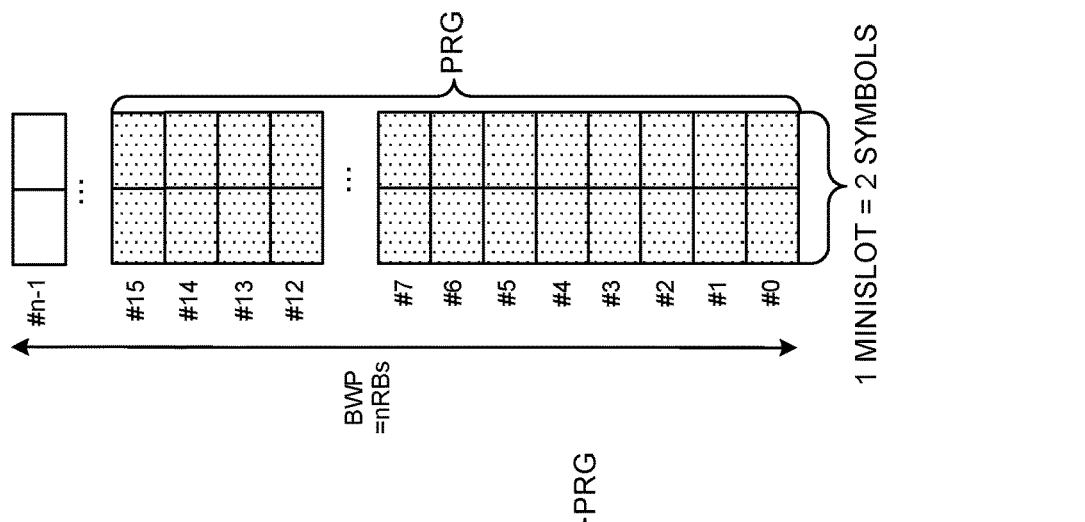
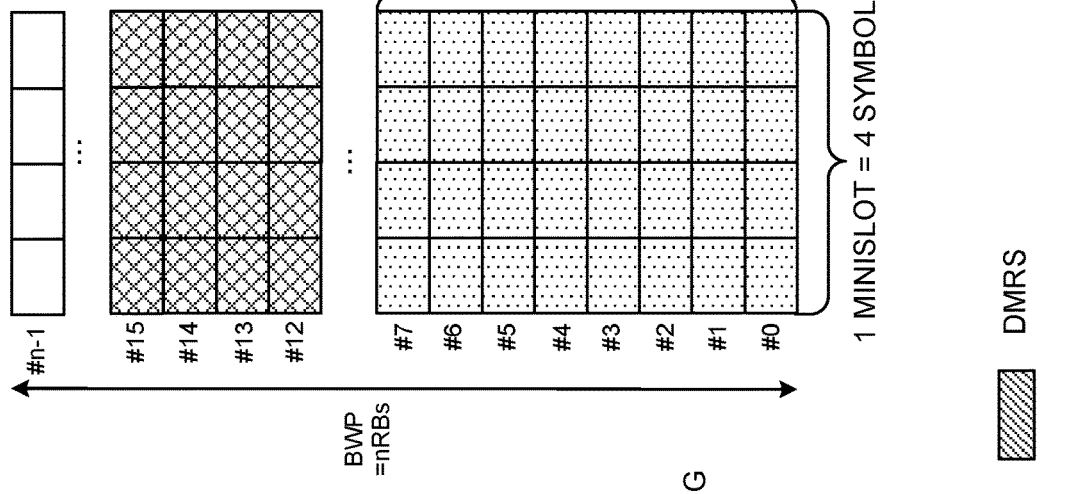
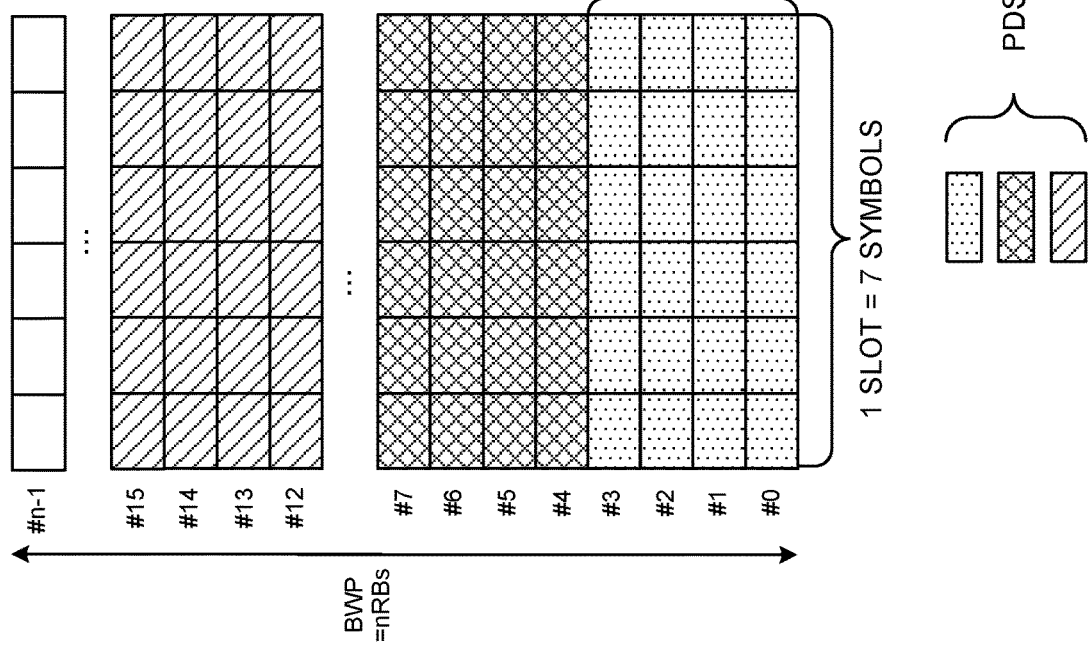

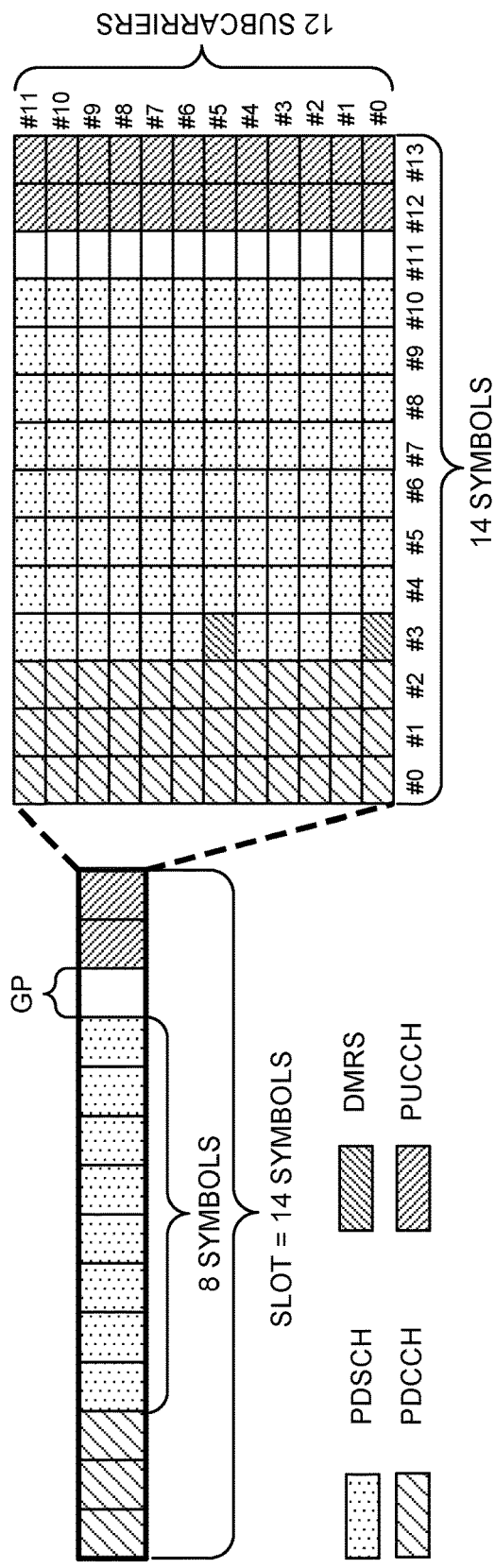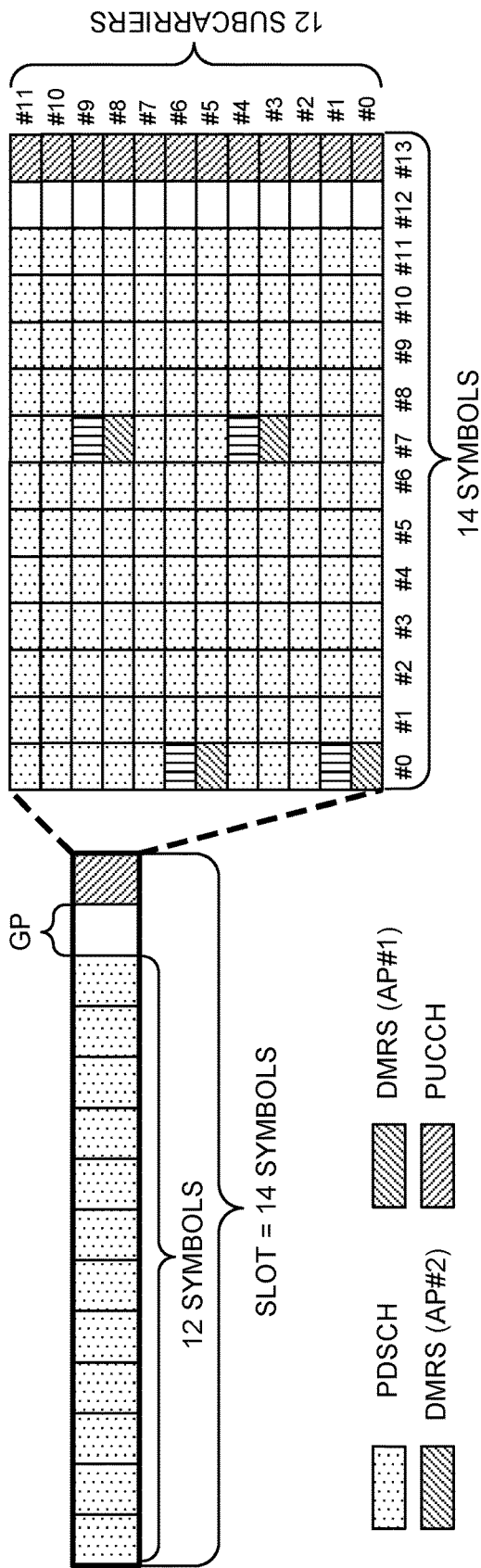

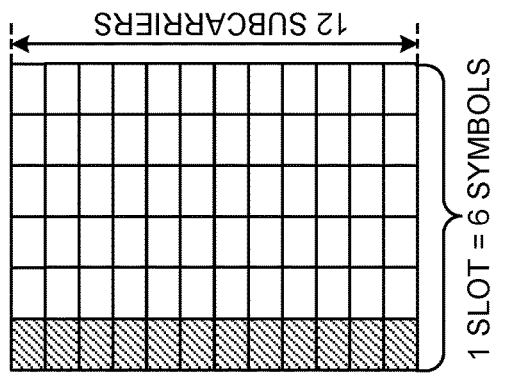
FIG. 7A
FIG. 7B
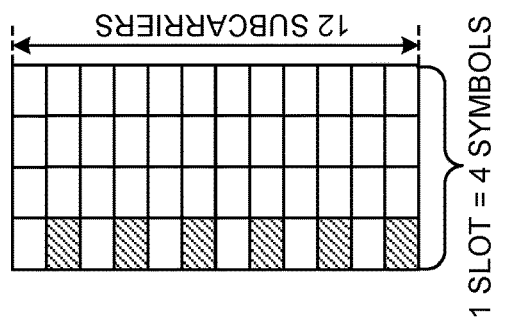
FIG. 7C
FIG. 7D
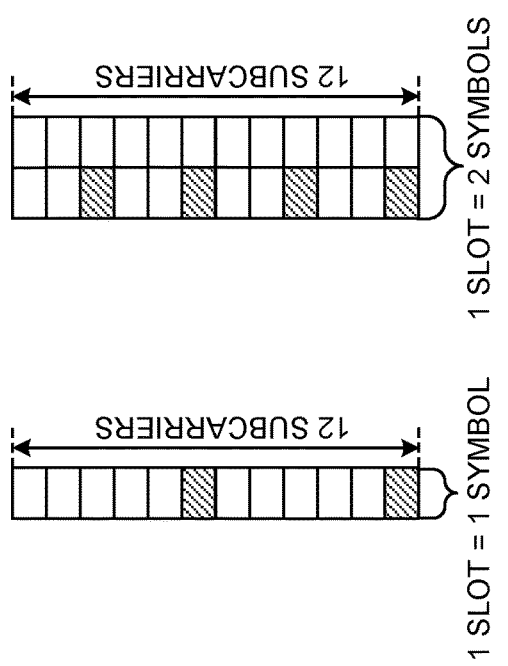
FIG. 7E
FIG. 7F

TRANSMITTING APPARATUS, RECEIVING APPARATUS AND RADIO COMMUNICATION METHOD

TECHNICAL FIELD

The present invention relates to transmitting apparatus, receiving apparatus and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower delays and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

Furthermore, in existing LTE systems (for example, LTE Rel. 8 to 13), downlink (DL) and/or uplink (UL) communication are carried out by using a subframe of 1 ms as a transmission period (scheduling period). When, for example, normal cyclic prefixes (NCPs) are used, this subframe is constituted by 14 symbols at a subcarrier spacing of 15 kHz. This subframe is also referred to as a "transmission time interval (TTI)" and so on.

To be more specific, in DL, a DL data channel of 2 or more layers (rank 2) (for example, PDSCH (Physical Downlink Shared CHannel)) is demodulated by using a user terminal-specific reference signal (for example, a DMRS (DeModulation Reference Signal)). This DMRS is placed in a predetermined resource element (RE), in a subframe where PDSCH is transmitted. Multiple DMRSs of different layers (antenna ports) are frequency-division-multiplexed (FDM) and/or code-division-multiplexed (CDM).

Now, in UL, a UL data channel (for example, PUSCH (Physical Uplink Shared CHannel)) is demodulated by using a user terminal-specific reference signal (for example, a DMRS). The DMRS is allocated to a predetermined symbol in a subframe, and placed over the whole band. Where there are multiple DMRSs corresponding to varying layers, different cyclic shifts (CSs) are applied to these. Also, different orthogonal spreading codes (for example, OCCs) are applied to the DMRSs of different user terminals.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, LTE Rel. 14 or later versions, 5G or NR, etc.), studies are in progress to make the length of the transmission period (including scheduling periods and/or the number of transmitting symbols) for data channels (including DL data channels and/or UL data channels, and also simply referred to as "data" and so on) variable.

Assuming such future radio communication systems, if DMRSs are provided in the same allocation patterns as in existing LTE systems (for example, LTE Rel. 8 to 13), where a data channel is scheduled in subframes of a fixed length (1 ms), there is a possibility that a data channel that might be transmitted in transmission periods of a variable length cannot be demodulated adequately. Therefore, there is a demand for DMRS allocation patterns that are suitable for future radio communication systems where a data channel might be transmitted in transmission periods of a variable length.

The present invention has been made in view of the above, and it is therefore an object of the present invention to provide transmitting apparatus, receiving apparatus and a radio communication method, whereby DMRS allocation patterns that are suitable for future radio communication systems can be realized.

Solution to Problem

According to one aspect of the present invention, transmitting apparatus has a transmission section that transmits a data channel, and a control section that controls the allocation of a reference signal that is used to demodulate the data channel, and the control section determines the allocation pattern of the reference signal in the frequency direction and/or the time direction based on the number of symbols in which the data channel is transmitted.

According to one aspect of the present invention, receiving apparatus has a receiving section that receives a data channel, and a control section that controls the demodulation of the data channel by using a reference signal, and the control section determines the allocation pattern of the reference signal in the frequency direction and/or the time direction based on the number of symbols in which the data channel is transmitted.

Advantageous Effects of Invention

According to the present invention, it is possible to realize DMRS allocation patterns that are suitable for future radio communication systems.

BRIEF DESCRIPTION OF DRAWINGS

FIGS. 5A to 5C are diagrams to show examples of determining PRG size based on transmission periods according to the first example;

FIGS. 6A and 6B are diagrams to show examples of controlling DMRS density according to a second example of the present invention;

FIGS. 7A to 7F are diagrams to show other examples of controlling DMRS density according to the second example;

DESCRIPTION OF EMBODIMENTS

Figure 1:
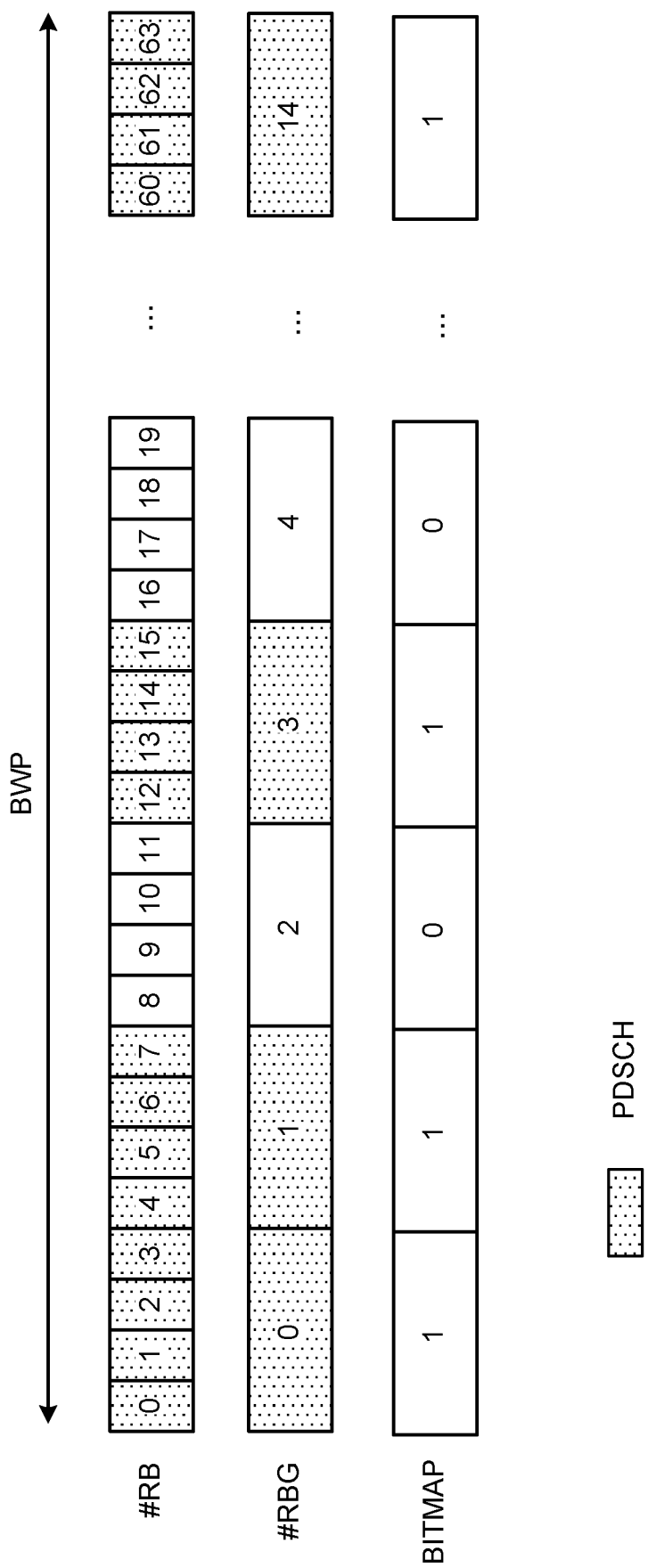
FIG. 1 is a diagram to show an example of a first RA type.

Envisaging future radio communication systems (for example, LTE Rel. 14 or later versions, 5G, NR, and so forth), studies are in progress to use a time unit having a variable time length (which may be, for example, at least one of a slot, a mini-slot and a predetermined number of symbols) as a scheduling unit for data channels (which include DL data channels and/or UL data channels, and which hereinafter may be referred to simply as "data" and so on).

A slot is a time unit that depends on what numerology (for example, subcarrier spacing and/or the duration of symbols) a user terminal uses. The number of symbols per slot may be determined by the subcarrier spacing. For example, if the subcarrier spacing is 15 kHz or 30 kHz, the number of symbols per slot may be seven or fourteen. When the subcarrier spacing is 60 kHz or greater, the number of symbols per slot may be fourteen.

Subcarrier spacing and the duration of symbols are reciprocal to each other. Therefore, as long as the number of symbols per slot is the same, the higher (wider) the subcarrier spacing, the shorter the length of slots, and the lower (narrower) the subcarrier spacing, the longer the length of slots.

Furthermore, a mini-slot is a time unit that is shorter than a slot. A mini-slot may be constituted by fewer symbols (for example, two or 3 symbols) than a slot. A mini-slot inside a slot may use the same numerology as that of the slot (for example, the same subcarrier spacing and/or the same symbol duration), or use different numerologies than the slot (for example, a wider subcarrier spacing than that of the slot and/or a shorter symbol duration than that of the slot).

In the DL of such future radio communication systems, studies are in progress to allocate the reference signal (for example, DMRS) for demodulating a DL data channel (for example, PDSCH) that is subject to slot-based scheduling, to the third or fourth symbol of a slot, on a fixed basis. Studies are in progress to allocate the reference signal (for example, DMRS) for demodulating a DL data channel (also referred to as "PDSCH" or "short (s) PDSCH," for example) that is subject to non-slot-based scheduling (for example, phrases such as "on a mini-slot basis" or "on a symbol basis" can also be used), to the first transmission symbol of this DL data channel.

Meanwhile, in the UL, the location (for example, the starting position) of the reference signal for demodulating (for example, DMRS) a UL data channel (for example, PUSCH) may be fixed based on the starting position of UL data that is scheduled, and/or determined based on the starting position of a slot or a mini-slot. The location where this DMRS is allocated may be changed depending on the period scheduled UL data is transmitted.

Hereinafter, the DL data channel and the UL data channel will be referred to as "PDSCH" and "PUSCH," respectively, but the names of the DL data channel and the UL data channel are not limited to these. The DL data channel may be also referred to as a "DL shared channel" and so on, and has only to be a channel for use for transmitting DL data (which may include high layer control information). Furthermore, the UL data channel is also referred to as a "UL shared channel" and so on, and has only to be a channel for use for transmitting UL data (and/or uplink control information (UCI (Uplink Control Channel)).

Also, the reference signal for demodulating the PDSCH and/or the PUSCH (PDSCH/PUSCH) is referred to as "DMRS," but it is also referred to as "demodulation reference signal," "pilot signal" or "channel estimation reference signal" and so on. The DMRS may be a user terminal-specific reference signal.

Also, envisaging future radio communication systems, it is also studied to change the size of resource block groups (RBGs) based on the band (BWP (bandwidth part)) that is used in resource allocation (RA) for user terminals (or that is available to user terminals). An RBG is constituted by one or more resource blocks (also referred to as "RB (Resource Blocks)," "PRBs (Physical Resource Blocks)," and the like). RBGs may also be used as units for allocating frequency resources to DL data and/or UL data.

The number of RBs (also referred to as "size" or "RBG size" and so on) per RBG and/or the number of RBGs in a BWP (also referred to as "the number of RBGs," and the like) may be determined, for example, based on at least one of following (1) to (5):

(1) The size of the bitmap that is used to allocate frequency resources in RBG units (DL RA type 0) may be configured by higher layer signaling, and both the RBG size and the number of RBGs may be determined based on the number of RBs that constitute the BWP (also referred to as "size," "BWP size" "bandwidth," and the like) and/or the size (the number of bits) of the bitmap.

(2) The RBG size may be configured by higher layer signaling and/or indicated by physical layer signaling (for example, downlink control information (DCI)), and the number of RBGs in the BWP may be determined based on the BWP size and/or the RBG size.

(3) The RBG size and/or the number of RBGs may be determined based on DCI format or the size (the number of bits) of DCI format. For example, if the size of the DCI is small, a larger RBG size may be determined than when the DCI is a normal size.

(4) The RBG size and/or the number of RBGs may be determined based on the number of symbols in which DL data and/or UL data are transmitted (also referred to as "transmission period" and the like). For example, for a shorter transmission period, an RBG size that is larger than the RBG size for longer transmission period may be determined.

(5) The RBG size and/or the number of RBGs may be determined based on the size of BWP. For example, the RBG size may be 1 RB if the BWP is constituted by 10 or fewer RBs, the RBG size may be 2 RBs if the BWP is constituted by 11 to 26 RBs, the RBG size may be 3 RBs if the BWP is constituted by 27 to 63 RBs, and the RBG size may be 4 RBs if the BWP is constituted by 64 or more RBs.

Also, envisaging future radio communication systems, studies are underway to use multi-carrier waveforms (for example, the cyclic prefix (CP)-OFDM waveform) for the PDSCH. Meanwhile, the use of single-carrier waveforms (for example, the DFT-spread OFDM waveform) and/or multi-carrier waveforms (CP-OFDM waveform) for the PUSCH is also under study. In the DFT-spread OFDM waveform, the PUSCH is allocated to contiguous transmission bands in order to achieve low PAPR (peak to Average Power Ratio).

Also, studies are in progress to support one or more schemes (types) for PDSCH/PUSCH resource allocation (RA) in future radio communication systems. For example, a first RA type to use bitmap (also referred to as "RA type 0," "DL RA type 0" and so on) and a second RA type to use the starting position of allocating resource and transmission bandwidth (also referred to as "RA type 1," "DL RA type 2," "UL RA type 0" and so on) may be supported.

According to the first RA type, a bitmap, which corresponds to each RBG comprised of one or more RBs, indicates the resources to allocate to the PDSCH/PUSCH. As shown in FIG. 1, according to the first RA type, non-contiguous frequency resources may be allocated to the PDSCH/PUSCH. Therefore, the first RA type may be applied to the PDSCH/PUSCH of multi-carrier waveforms (for example, the CP-OFDM waveform).

FIG. 1 is a diagram to show an example of the first RA type. FIG. 1 assumes that a BWP is constituted by 64 RBs #0 to #63. Also, assume that the BWP is constituted by 15 RBGs #0 to #15, and the RBG size is 4 RBs. FIG. 1 is simply an example, and the BWP size, the number of RBGs and the RBG size are by no means limited to those shown in this drawing. Also, although FIG. 1 exemplifies the PDSCH, this bitmap can also be applied to resource allocation for the PUSCH.

As shown in FIG. 1, the number of bits in the bitmap may be equal to or larger than the number of RBGs in the BWP (for example, in FIG. 1, the number of bits is equal to the number of RBGs). For example, in FIG. 1, RBGs #0, #1, #3 and #14, corresponding to the bit "1," are allocated to the PDSCH. The PDSCH for a user terminal is scheduled by using DCI (DCI format) containing this bitmap.

Figure 2:
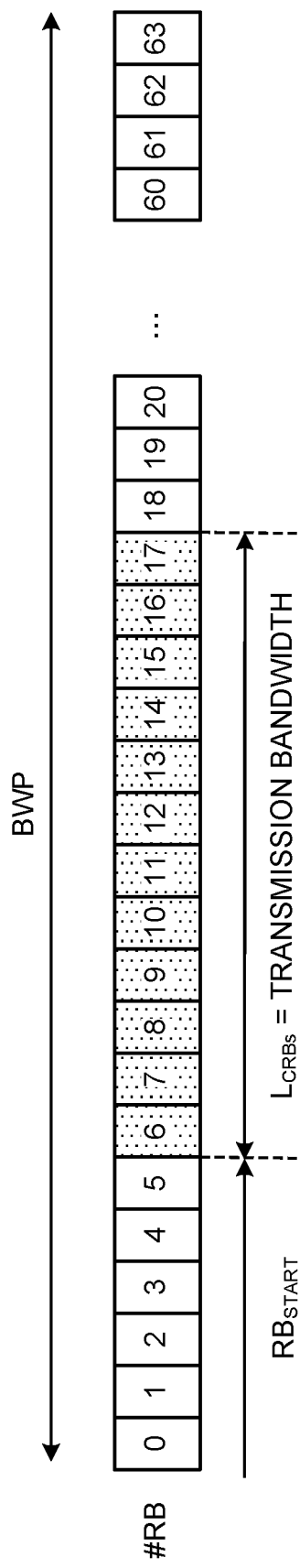
FIG. 2 is a diagram to show an example of a second RA type.

In the second RA type, the starting position of resource blocks (also referred to as the "starting resource block," "$RB_{START}$," and the like) and the transmission bandwidth (also referred to as the "transmitting band," the "length of allocating resource blocks," "$L_{CRBs}$ ($L_{CRBs} \geq 1$)," and the like) indicate the resources to allocate to the PDSCH/PUSCH. As shown in FIG. 2, according to the second RA type, contiguous frequency resources are allocated to the PDSCH/PUSCH. Therefore, the second RA type may be applied not only to the PDSCH/PUSCH of multi-carrier waveforms (for example, the CP-OFDM waveform) but also to the PUSCH of single-carrier waveforms (for example, the DFT-spread OFDM waveform).

FIG. 2 is a diagram to show an example of the second RA type. FIG. 2 assumes that the BWP is constituted by 64 RBs #0 to #63. In FIG. 2, one or more contiguous resource blocks (RBs), specified by the starting position of resource blocks ($RB_{START}$) and the transmission bandwidth ($L_{CRBs}$), are allocated to the PDSCH or the PUSCH.

For example, in FIG. 2, RB #6 is allocated as a starting position and 12 contiguous RBs #6 to #17 are allocated to the PDSCH or the PUSCH. In this way, in FIG. 2, resources for the PDSCH or the PUSCH are allocated in RB units, not RBG units. A user terminal may determine RBs #6 to #17 to be allocated to the PDSCH or the PUSCH based on a resource indicator (RIV (Resource Indication Value)) contained in DCI. This RIV may be determined based on at least one of the BWP size, the starting position ($RB_{START}$) and the transmission bandwidth ($L_{CRBs}$).

Now, when non-slot-based scheduling (also referred to as "mini-slot-based scheduling," "symbol-based scheduling," and the like) is configured for a user terminal, the number of symbols for transmitting the PDSCH/PUSCH (transmission period) may be variable. For example, this transmission period may consist of at least one symbol, and may of at most a number of symbols to match the number of symbols in the slot minus one. In general, when the transmission period of the PDSCH/PUSCH decreases, the bandwidth to be allocated to the PDSCH/PUSCH is expected to increase.

The optimal positions and/or density of DMRSs in the frequency direction and/or the time direction (also referred to as "allocation pattern" and the like) vary depending on the transmission period of the PDSCH/PUSCH (including the scheduling period and/or the number of transmitting symbols). Therefore, when the transmission period of the PDSCH/PUSCH is variable, it is desirable to realize scalable and simple DMRS allocation patterns while maintaining the accuracy of channel estimation and low coding rates.

So, the present inventors have come up with the idea of realizing scalable and simple DMRS allocation patterns, while maintaining the accuracy of channel estimation and low coding rates of the PDSCH/PUSCH transmitted in variable transmission periods, by determining the DMRS allocation pattern (DMRS pattern) based on the transmission period of PDSCH/PUSCH.

Now, embodiments of the present invention will be described below in detail with reference to the accompanying drawings. Note that "transmitting apparatus" as used herein may refer to a user terminal (UE) that transmits the PUSCH, in the UL, or refer to a radio base station that transmits the PDSCH, in the DL. "Receiving apparatus" as used herein may refer to a radio base station that receives the PUSCH in the UL, or refer to a user terminal that receives the PDSCH, in the DL.

First Example

In a first example of the present invention, the size of a precoding resource block group (PRG), in which DMRSs are allocated based on the same allocation pattern, may be determined. A PRG may be a group of one or more RBs to which the same precoding weight is applied.

In the first example, the size of a PRG may be determined based on at least one of the number of symbols (transmission period) for transmitting a data channel (PDSCH/PUSCH), the resource allocation (RA) type for the data channel (for example, the first RA type or the second RA type), the RBG size, and the number of RBGs in the BWP.

Also, at least one of the number and location of symbols for allocating DMRSs and the number and location of subcarriers may be defined within N (N≥1) RBs as a DMRS pattern. Here, the PRG size may be equal to N*K (where K is a positive integer). For example, the DMRS pattern may be defined by the number of subcarriers (or "X") per N RBs.

<PRG for First RA Type>

When the first RA type (for example, FIG. 1) is used, the number of RBs constituting 1 PRG (also referred to as the "size of a PRG," the "PRG size," and the like) may be equal to the number of RBs that constitute one or more contiguous RBGs (that is, the RBG size or the number of RBs to constitute multiple contiguous RBGs).

Figure 3:
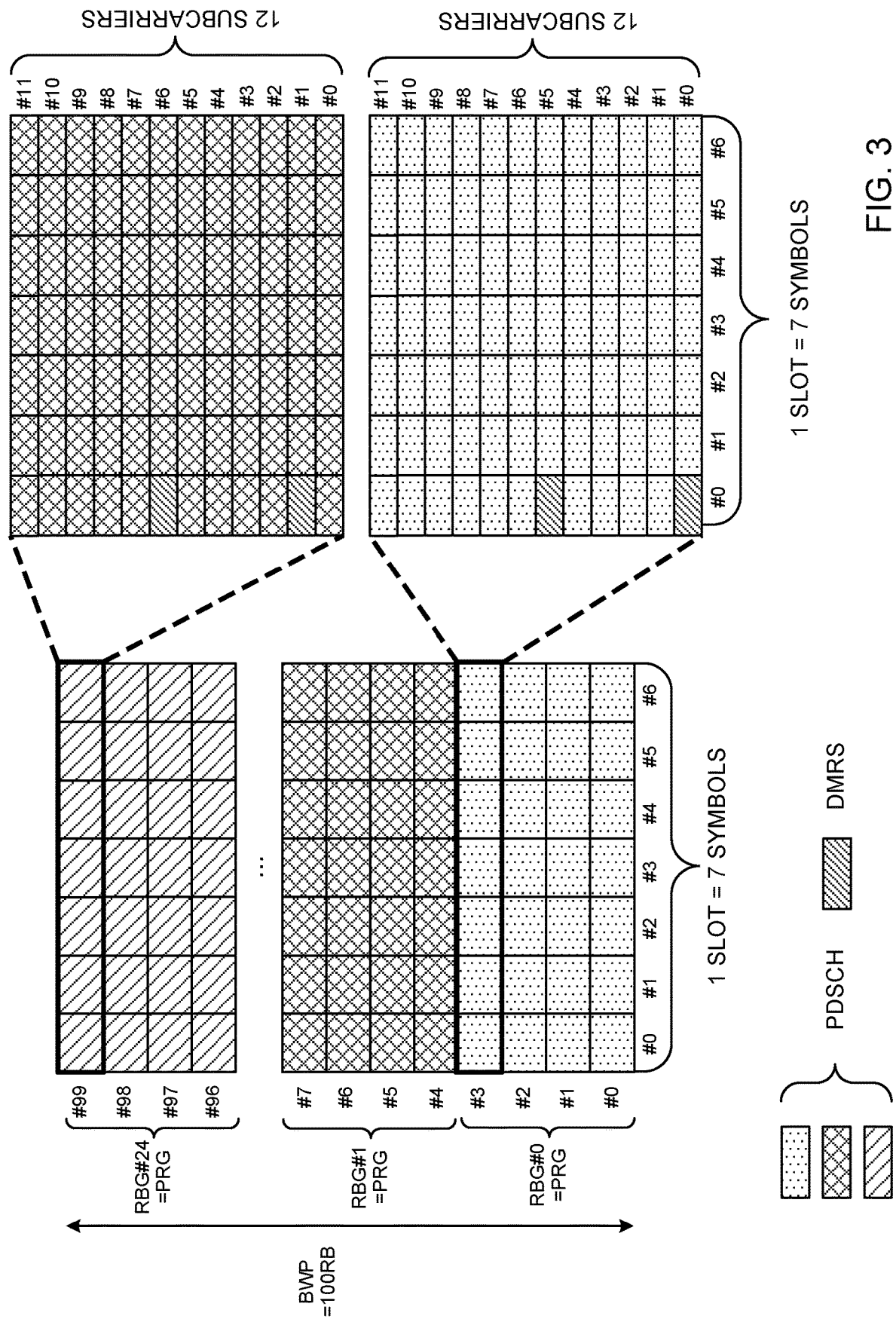
FIG. 3 is a diagram to show an example of determining PRG size for the first RA type according to a first example of the present invention.

FIG. 3 is a diagram to show an example of determining the PRG size for the first RA type according to the first example. FIG. 3 assumes that the BWP is constituted by 100 RBs #0 to #99, the RBG size is 4 RBs, and 25 RBGs #0 to #24 are provided in the BWP. Also, assume that one slot is comprised of 7 symbols. Note that FIG. 3 is simply an example, the number of RBs in the BWP, the RBG size, the number of RBGs, and the number of symbols in one slot are by no means limited to those shown in FIG. 3.

Furthermore, FIG. 3 assumes that at least RBGs #0, #1 and #24 are allocated to the PDSCH for a user terminal based on a bitmap of the first RA type. Note that, although the PDSCH is exemplified in FIG. 3, the same scheme can be applied to the PUSCH of the CP-OFDM waveform as well.

For example, in FIG. 3, the PRG size is configured equal to the RBG size (4 RBs). In FIG. 3, the number of RBs to which one DMRS pattern is applied is N=1, so that a predetermined coefficient K=4 is used. Furthermore, for the DMRS pattern, the number of subcarriers per N RBs (here, N=1) may be defined as X=2. Note that, in FIG. 3, one or more DMRSs may be code-division-multiplexed (CDM) on the same RE.

In FIG. 3, the same DMRS pattern is applied to RBs belonging to the same PRG (here, the same RBG). For example, in RB #3 of FIG. 3, DMRSs are allocated to subcarriers #0 and #5 of symbol #0 in one slot. The same DMRS pattern as that of RB #3 is also applied to RBs #0 to #2, which belong to RBG #0 (PRG) together with RB #3.

Meanwhile, in FIG. 3, different DMRS patterns may be applied to a number of RBs belonging to different PRGs (here, different RBGs). For example, RB #99 of FIG. 3 belongs to RBG #24 (PRG), which is different from that of above RB #3, so that, unlike above RB #3, DMRSs are allocated to subcarriers #2 and #6 of symbol #0 in one slot. In this way, the same DMRS pattern as that of RB #99 is applied to RBs #96 to #99, belonging to RBG #24 together with RB #99.

Thus, different PRGs may have different DMRS patterns (in which, for example, at least one of the number and location of symbols for allocating DMRSs, the number and locations of subcarriers, the cyclic shift (CS) value, and the OCC varies). Note that, in FIG. 3, the same DMRS pattern may be configured between different PRGs (for example, between PRGs that are contiguous in the frequency direction). Also, in FIG. 3, 1 PRG may be constituted by a number of contiguous RBGs (for example, 2 RBGs #0 and #1).

As shown in FIG. 3, in the event 1 PRG is structured based on RBG size, when non-contiguous RBGs are allocated to the PDSCH/PUSCH according to the first RA type, DMRS patterns can be controlled adequately.

<PRG for Second RA Type>

When the second RA type is used (for example, FIG. 2), the PRG size may be equal to the transmission bandwidth ($L_{CRBs}$), or may be equal to a subset of this transmission bandwidth. The number of RBs to constitute this subset is smaller than the number of RBs that constitute the transmission bandwidth.

Figure 4:
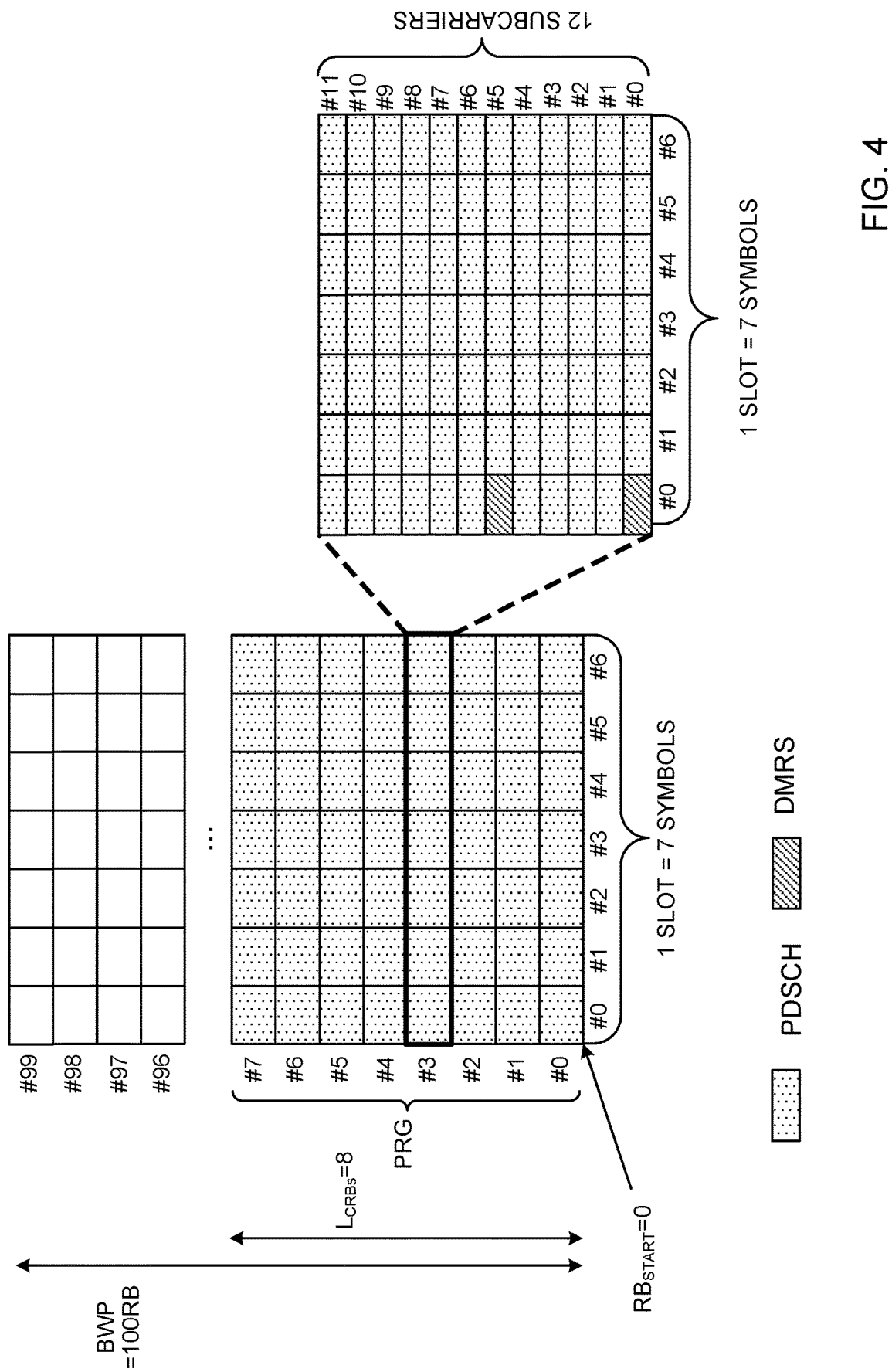
FIG. 4 is a diagram to show an example of determining PRG size for the second RA type according to the first example.

FIG. 4 is a diagram to show an example of determining the PRG size for the second RA type according to the first example. FIG. 4 assumes that the BWP is constituted by 100 RBs #0 to #99, the starting position of RBs ($RB_{START}$) allocated to the PDSCH is 0, the transmission bandwidth ($L_{CRBs}$) is 8, and RBs #0 to #7 are allocated to the PDSCH. Also, assume that one slot is comprised of 7 symbols.

Note that FIG. 4 is simply an example, the number of RBs in the BWP, $RB_{START}$, $L_{CRBs}$, and the number of symbols in one slot are by no means limited to those shown in FIG. 4. Note that although the PDSCH is exemplified in FIG. 4, the same scheme can be applied to the PUSCH of the CP-OFDM waveform and/or the DFT-spread OFDM waveform as well.

For example, in FIG. 4, the PRG size is configured equal to the transmission bandwidth ($L_{CRBs}$). In FIG. 4, the number of RBs to which one DMRS pattern is applied is N=1, so that a predetermined coefficient K=4 is used. Furthermore, for the DMRS pattern, the number of subcarriers per N RBs (here, N=1) may be defined as X=2. Note that, although not shown in the drawing, it is equally possible to provide a number of subsets in a transmission bandwidth, and configure PRGs on a per subset basis.

In FIG. 4, it takes a whole transmission bandwidth ($L_{CRBs}$) to constitute a PRG, so that the same DMRS pattern is applied to the RBs belonging to a PRG. For example, in RB #3 of FIG. 4, DMRSs are allocated to subcarriers #0 and #5 of symbol #0 in one slot. For the other RBs in the transmission bandwidth (here, #0 to #2, and #4 to #7), the same DMRS pattern as that of RB #3 is applied.

As shown in FIG. 4, in the event 1 PRG is structured based on transmission bandwidth ($L_{CRBs}$), when contiguous RBs are allocated to the PDSCH/PUSCH according to the second RA type, DMRS patterns can be controlled adequately.

<PRG Control Based on Transmission Period>

As described above, the PRG size may be determined based on at least one of the number of RBs in the BWP, the number of RBGs in the BWP, the RBG size, the starting position of allocated RBs ($RB_{START}$), the transmission bandwidth ($L_{CRBs}$), and the RA type. The PRG size may be controlled based on the number of symbols (transmission period) in which the PDSCH/PUSCH is transmitted.

FIG. 5 are diagrams to show examples of determining the PRG size based on the transmission period according to the first example. FIG. 5 assume that the BWP is constituted by n RBs #0 to #n−1 (here, n≥16). Note that, in FIG. 5, either the first RA type or the second RA type may be used. Also, although FIG. 5 exemplify the PDSCH, the same scheme can be applied to the PUSCH.

FIG. 5A shows that a slot is comprised of 7 symbols, FIG. 5B shows that a mini-slot is comprised of 4 symbols, and FIG. 5C shows that a mini-slot is comprised of 2 symbols. As shown in FIGS. 5A to 5C, the PRG size may be changed based on the transmission period of the PDSCH. To be more specific, the shorter the transmission period of the PDSCH, the larger the PRG size may be set.

For example, in FIG. 5A, in a slot of 7 symbols, a PRG is constituted by 4 RBs. In FIG. 5B, in a mini-slot of 4 symbols, a PRG is constituted by 8 RBs. In FIG. 5C, in a mini-slot of 2 symbols, a PRG is constituted by 16 RBs. In this way, when the PRG size is changed depending on the transmission period of the PDSCH (the number of symbols in a slot (or a mini-slot)), the number and/or density of DMRSs can be made substantially uniform over the entire PRG.

As described above, according to the first example, the PRG size where the same DMRS pattern is applied is determined based on the number of symbols (transmission period) in which the PDSCH/PUSCH is transmitted, so that scalable and simple DMRS allocation patterns can be realized while maintaining the accuracy of channel estimation and low coding rates of The PDSCH/PUSCH transmitted in variable transmission periods.

Second Example

With a second example of the present invention, to provide a DMRS pattern, the density at which DMRSs are allocated in the frequency direction and/or the time direction (DMRS density) is determined based on the number of symbols (transmission period) in which the PDSCH/PUSCH is transmitted. To be more specific, at least one of the number of subcarriers where DMRSs are allocated, the number of symbols, the density, the number of DMRS antenna ports (also referred to as "DMRS ports" and the like), the CS value, and the OCC may be controlled based on the number of PDSCH/PUSCH-transmitting symbols.

FIG. 6 are diagrams to show examples of controlling the density of DMRSs according to the second example. FIGS. 6A and 6B show slots comprised of 14 symbols. Note that although FIG. 6 each exemplify the DMRS for the PDSCH, the same scheme can be applied to the DMRS for the PUSCH as well. Note that the slot structures (for example, at least one of the number of symbols, the types of channels, and the allocation of channels in symbols) shown in FIGS. 6A and 6B simply illustrate examples, and are by no means limiting.

Referring to FIG. 6A, a DL control channel (for example, PDCCH (Physical Downlink Control CHannel)) is allocated to 3 symbols #0 to #2 in one slot, the PDSCH is allocated to 8 symbols #3 to #10, and a UL control channel (for example, PUCCH (Physical Uplink Control CHannel)) is allocated to 2 symbols #12 and #13. Symbol #11 is used as a guard period (GP) for switching between DL and UL. For example, in FIG. 6A, the DMRS is allocated to two subcarriers #0 and #5 in symbol #3 where the PDSCH is transmitted first.

Also, in FIG. 6B, in one slot, the PDSCH is allocated to 12 symbols #0 to #11, and the PUCCH is allocated to one symbol #13. Symbol #12 is used as a GP. Referring to FIG. 6B, for example, DMRS ports #1 and #2 are allocated to subcarriers #0 and #5, and to subcarriers #1 and #6, in symbol #0 where the PDSCH is transmitted first, respectively. Furthermore, in FIG. 6B, DMRS ports #1 and #2 are also allocated to subcarriers #3 and #8, and to subcarriers #4 and #9, in symbol #7, respectively.

In FIG. 6B, as compared with FIG. 6A, the number of symbols for transmitting the PDSCH increases, so that the number of symbols to allocate DMRSs and the number of DMRS ports also increase. Note that, although not shown in the drawings, when the number of symbols for transmitting the PDSCH increases, the number of subcarriers to allocate the same DMRS port to in one symbol might increase as well.

FIG. 7 are diagrams to show other examples of controlling the density of DMRSs according to the second example. FIGS. 7A to 7D show slots (also referred to as "mini-slots" and the like) constituted by 1, 2, 4 and 6 symbols, respectively, and FIGS. 7E and 7F show slots comprised of 10 and 14 symbols, respectively.

As shown in FIGS. 7A to 7D, the density of DMRSs per symbol may be increased by increasing the number of subcarriers where DMRSs are allocated in 1 RB as the number of symbols to transmit the PDSCH/PUSCH increases.

Also, as shown in FIGS. 7E and 7F, when the number of symbols to transmit the PDSCH/PUSCH increases, the number of symbols to allocate DMRSs in these transmitting symbols is increased, the number of REs to allocate DMRSs in resources allocated to the PDSCH/PUSCH may be increased.

According to the second example, the density of DMRSs is determined based on the number of symbols (transmission period) for transmitting the PDSCH/PUSCH, so that scalable and simple DMRS allocation patterns can be realized while maintaining the accuracy of channel estimation and low coding rates of the PDSCH/PUSCH transmitted in variable transmission periods.

Third Example

According to a third example of the present invention, signaling of DMRS patterns to user terminals will be described. Note that the third example can be applied to the first and/or second examples. Also, the third example can be applied to DMRS patterns for the PDSCH/PUSCH. According to the third example, DMRS patterns for use in user terminals may be signaled implicitly or signaled explicitly.

In the event implicit signaling is used, a user terminal may determine the DMRS pattern for the PDSCH/PUSCH based on the number of symbols (transmission period) in which the PDSCH/PUSCH is transmitted. Also, the user terminal may determine the DMRS pattern for the PDSCH/PUSCH based on the number of these transmission symbols and the bandwidth where the PDSCH/PUSCH is scheduled.

In the event explicit signaling is used, the user terminal may determine the DMRS pattern for the PDSCH/PUSCH based on higher layer signaling and/or L1 signaling.

(Radio Communication System)

Now, the structure of a radio communication system according to the present embodiment will be described below. In this radio communication system, the radio communication methods according to the above-described embodiments are employed. Note that the radio communication method according to each embodiment described above may be used alone or may be used in combination.

Figure 8:
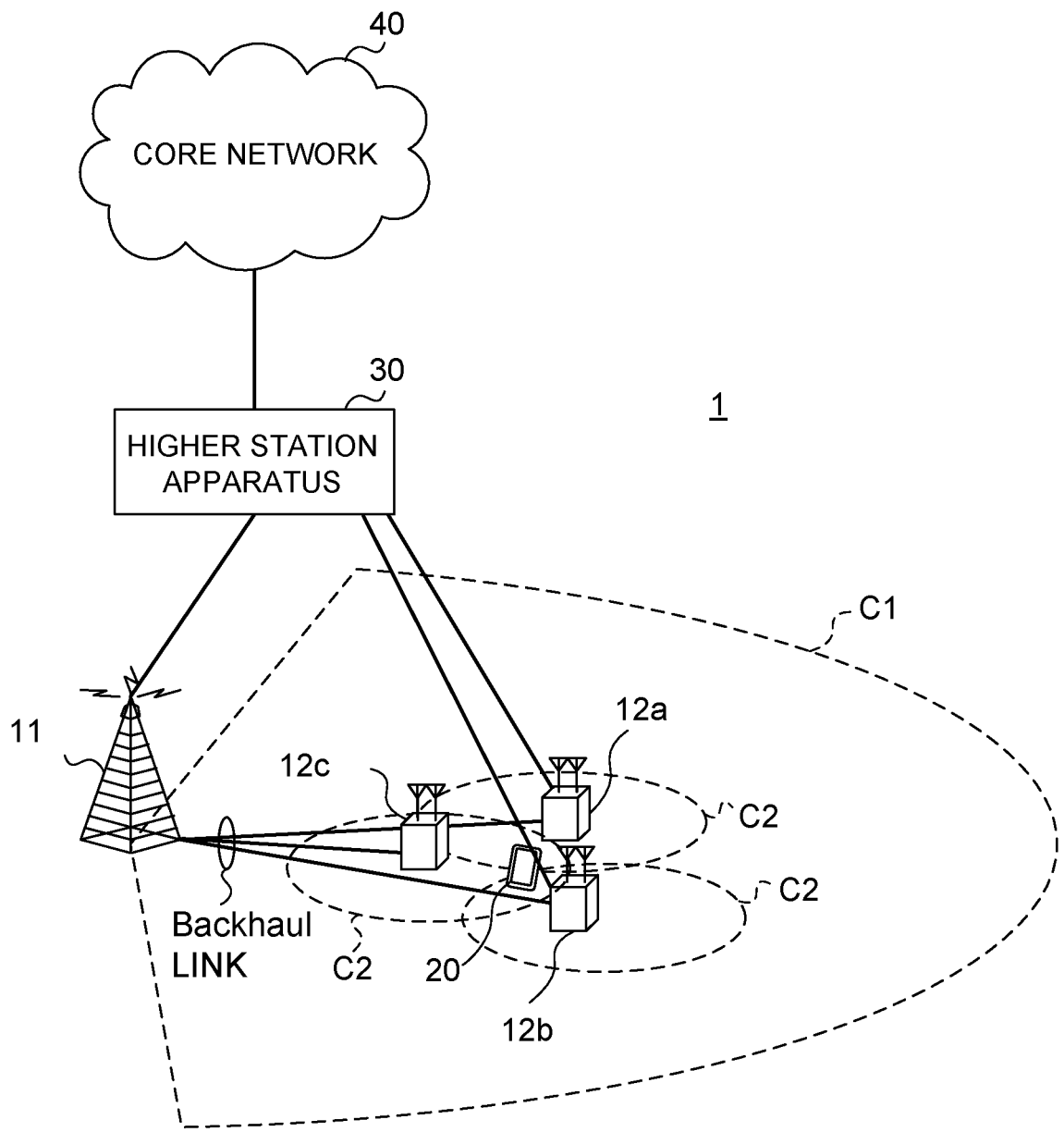
FIG. 8 is a diagram to show an example of a schematic structure of a radio communication system according to an embodiment of the present invention.

FIG. 8 is a diagram to show an exemplary schematic structure of a radio communication system according to the present embodiment. A radio communication system 1 can adopt carrier aggregation (CA), which groups a number of fundamental frequency blocks (component carriers (CCs)) into one, using LTE system bandwidth (for example, 20 MHz) as one unit, and/or dual connectivity (DC), which uses a plurality of cell groups (CGs) that each accommodate one or more CCs. Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 shown in FIG. 8 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different numerologies are applied between cells and/or within cells may be adopted here. Note that a "numerology" refers to a set of communication parameters that characterize the design of signals in a given RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, 2 or more CCs). Furthermore, the user terminals can use licensed-band CCs and unlicensed-band CCs as a plurality of cells.

Furthermore, the user terminals 20 can communicate based on time division duplexing (TDD) or frequency division duplexing (FDD) in each cell. A TDD cell and an FDD cell may be referred to as a "TDD carrier (frame structure type 2)" and an "FDD carrier (frame structure type 1)," respectively.

Also, in each cell (carrier), a slot having a relatively long time length (for example, 1 ms) (also referred to as a "TTI," a "normal TTI," a "long TTI," a "normal subframe," a "long subframe," a "subframe" and so forth) and/or a slot having a relatively short time length (also referred to as a "mini-slot," a "short TTI," a "short subframe," and so forth) may be used. Furthermore, in each cell, subframes of 2 or more time lengths may be used.

Between the user terminals 20 and the radio base station 11, communication can be carried out using a carrier of a relatively low frequency band (for example, 2 GHz) and a narrow bandwidth (referred to as, for example, an "existing carrier," a "legacy carrier," and/and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform device-to-device (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combination of these, and OFDMA may be used in the UL. Also, SC-FDMA can be applied to a side link (SL) that is used in inter-terminal communication.

DL channels that are used in the radio communication system 1 include a DL data channel that is shared by each user terminal 20 (also referred to as "PDSCH (Physical Downlink Shared CHannel)," "DL shared channel" and so forth), a broadcast channel (PBCH (Physical Broadcast CHannel)), L1/L2 control channels and so on. At least one of user data, higher layer control information, SIBs (System Information Blocks) and so forth is communicated in the PDSCH. Also, the MIB (Master Information Block) is communicated in the PBCH.

The L1/L2 control channels include DL control channels (such as PDCCH (Physical Downlink Control CHannel), EPDCCH (Enhanced Physical Downlink Control CHannel), etc.), PCFICH (Physical Control Format Indicator CHannel), PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. PUSCH retransmission control information (also referred to as "A/N," "HARQ-ACK," "HARQ-ACK bit," "A/N code book" and so on) can be communicated using at least one of the PHICH, the PDCCH and the EPDCCH.

UL channels that are used in the radio communication system 1 include a UL shared channel that is shared by each user terminal 20 (also referred to as "PUSCH (Physical Uplink Shared CHannel)," "UL shared channel" and/and so on), a UL control channel (PUCCH (Physical Uplink Control CHannel)), a random access channel (PRACH (Physical Random Access CHannel)) and so on. User data, higher layer control information and so on are communicated by the PUSCH. Uplink control information (UCI), including at least one of retransmission control information (for example, A/N, HARQ-ACK) for the PDSCH, channel state information (CSI) and so on is communicated in the PUSCH or the PUCCH. By means of the PRACH, random access preambles for establishing connections with cells are communicated.

(Radio Base Station)

Figure 9:
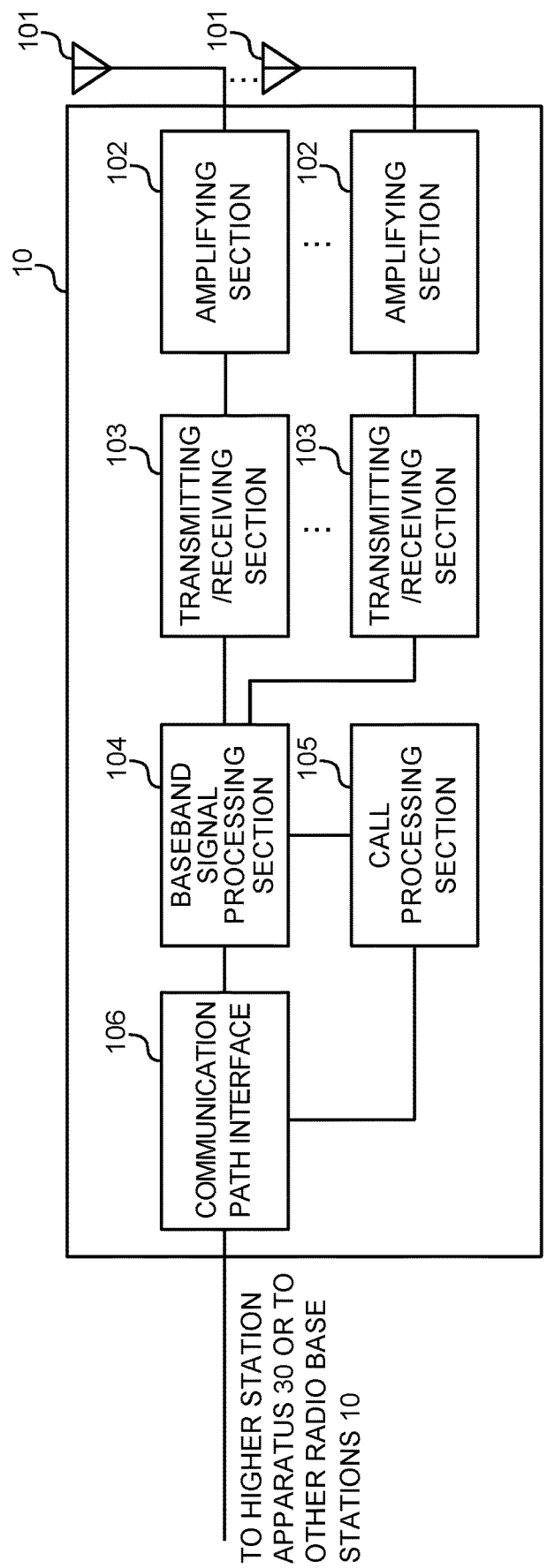
FIG. 9 is a diagram to show an example of an overall structure of a radio base station according to the present embodiment.

FIG. 9 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 And a communication path interface 106. Note that one or more transmitting/receiving antennas 101, amplifying sections 102 and transmitting/receiving sections 103 may be provided. The radio base station 10 may be "receiving apparatus" in UL and "transmitting apparatus" in DL.

User data to be transmitted from the radio base station 10 to a user terminal 20 is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control)

layer transmission processes such as RLC retransmission control, MAC (Medium Access Control) retransmission control (for example, an HARQ (Hybrid Automatic Repeat reQuest) transmission process), scheduling, transport format selection, channel coding, rate matching, scrambling, an inverse fast Fourier transform (IFFT) process and a precoding process, and the result is forwarded to the transmitting/receiving sections 103. Furthermore, downlink control signals are also subjected to transmission processes such as channel coding and/or an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

A transmitting/receiving section 103 can be constituted by a transmitters/receiver, a transmitting/receiving circuit or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 at least performs call processing such as setting up and releasing communication channels, manages the state of the radio base station 10, or manages the radio resources.

The communication path interface section 106 transmits and receives signals to and from the higher station apparatus 30 via a predetermined interface. Also, the communication path interface 106 may transmit and receive signals (backhaul signaling) with neighboring radio base stations 10 via an inter-base station interface (which is, for example, optical fiber in compliance with the CPRI (Common Public Radio Interface), the X2 interface, etc.).

Also, the transmitting/receiving sections 103 transmit DL signals (for example, at least one of DCI (including at least one of DL assignment, UL grant, and common DCI), DL data (channel), reference signals, and high layer control information) and/or receive UL signals (for example, at least one of UL data (channel), UCI, reference signals, and higher layer control information).

To be more specific, the transmitting/receiving sections 103 may transmit a DL data channel (for example, PDSCH) in transmission periods of variable length (for example, slots, mini-slots, a predetermined number of symbols, and so on), and/or receive a UL data channel (for example, PUSCH).

Figure 10:
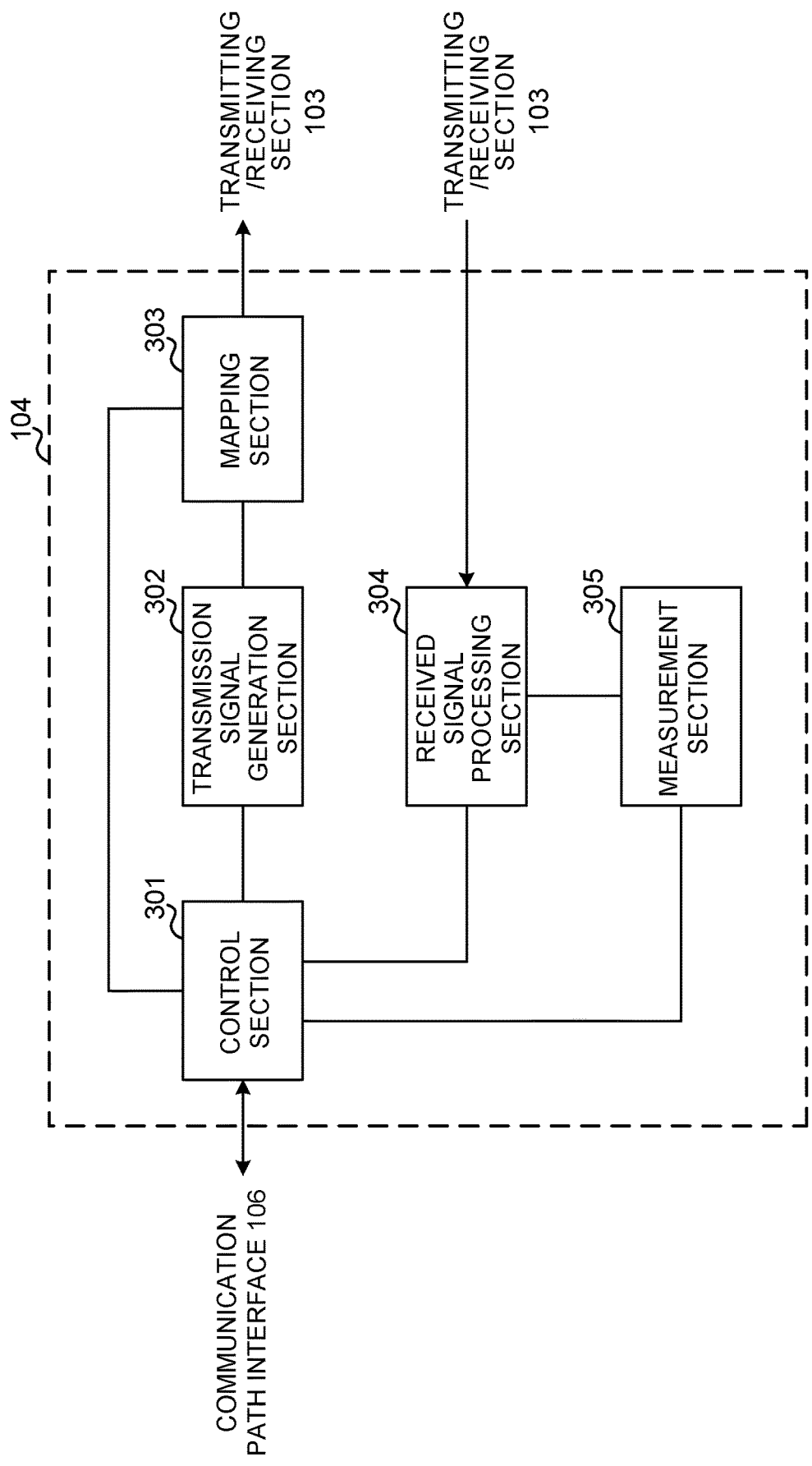
FIG. 10 is a diagram to show an example of a functional structure of a radio base station according to the present embodiment.

FIG. 10 is a diagram to show an exemplary functional structure of a radio base station according to the present embodiment. Note that, although FIG. 10 primarily shows functional blocks that pertain to characteristic parts of the present embodiment, the radio base station 10 has other functional blocks that are necessary for radio communication as well. As shown in FIG. 10, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, generation of DL signals in the transmission signal generation section 302, mapping of DL signals in the mapping section 303, UL signal receiving processes (for example, demodulation) in the received signal processing section 304, and measurements in the measurement section 305. Also, the control section 301 may control the scheduling of data channels (including DL data channels and/or UL data channels).

The control section 301 also controls the allocation of a reference signal (for example, DMRS) that is used to demodulate a data channel (which may be DL data channel or a UL data channel). To be more specific, the control section 301 may determine the allocation pattern (for example, the DMRS pattern) for this reference signal in the frequency direction and/or the time direction based on the number of symbols (transmission period) in which the data channel is transmitted.

Also, the control section 301 may determine the size of a precoding resource block group (PRG), in which the reference signal is allocated by using the same allocation pattern, based on the number of symbols (transmission period) in which the data channel is transmitted (first example and FIG. 5).

Also, the control section 301 may determine the size of a PRG based on at least one of the type of resource allocation (RA) that is applied to the data channel, the RBG size, the number of RBGs in the BWP, and the transmission bandwidth (first example). In addition, the control section 301 may control the allocation pattern of the reference signal in the PRG.

For example, if resources are allocated to the data channel based on the first RA type, the control section 301 may determine the PDG size based on the RBG size (FIG. 3). Also, when resources are allocated to the data channel based on the second RA type, the control section 301 may determine the PRG size based on the transmission bandwidth (FIG. 4).

In addition, the control section 301 may determine the allocation density of the reference signal in the frequency direction and/or the time direction as the allocation pattern of the reference signal, based on the number of symbols (transmission period) in which this data channel is transmitted (the second example, FIG. 6 and FIG. 7).

The control section 301 may also control the reporting of reference signal allocation patterns (for example, DMRS patterns) through higher layer signaling (for example, RRC signaling) and/or L1 signaling (for example, DCI) (third example).

The control section 301 can be constituted by a controller, a control circuit or control apparatus that can be described based on general understanding of the technical field to which the present invention pertains.

The transmission signal generation section 302 may generate DL signals (including at least one of DL data (channel), DCI, DL reference signals, control information to be sent in higher layer signaling) as commanded from the control section 301, and output these signals to the mapping section 303.

The transmission signal generation section 302 can be constituted by a signal generator, a signal generating circuit or signal generating apparatus that can be described based on general understanding of the technical field to which the present invention pertains.

The mapping section 403 maps the UL signals generated in the transmission signal generation section 402 to radio resources, as commanded from the control section 401, and outputs these to the transmitting/receiving sections 203. For example, the mapping section 303 maps reference signals to predetermined radio resources in allocation patterns determined by the control section 301.

The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) for UL signals that are transmitted from the user terminals 20. For example, the received signal processing section 304 may demodulate a UL data channel by using a reference signal that is provided in an allocation pattern determined in the control section 301. To be more specific, the received signal processing section 304 may output the received signals and/or the signals after receiving processes to the measurement section 305.

The received signal processing section 304 can be constituted by a signal processor, a signal processing circuit or signal processing apparatus that can be described based on general understanding of the technical field to which the present invention pertains. Also, the received signal processing section 304 can constitute the receiving section according to the present invention.

The measurement section 305 may measure UL channel quality based on, for example, the received power (for example, RSRP (Reference Signal Received Power)) and/or the received quality (for example, RSRQ (Reference Signal Received Quality)) of reference signals. The measurement results may be output to the control section 301.

(User Terminal)

Figure 11:
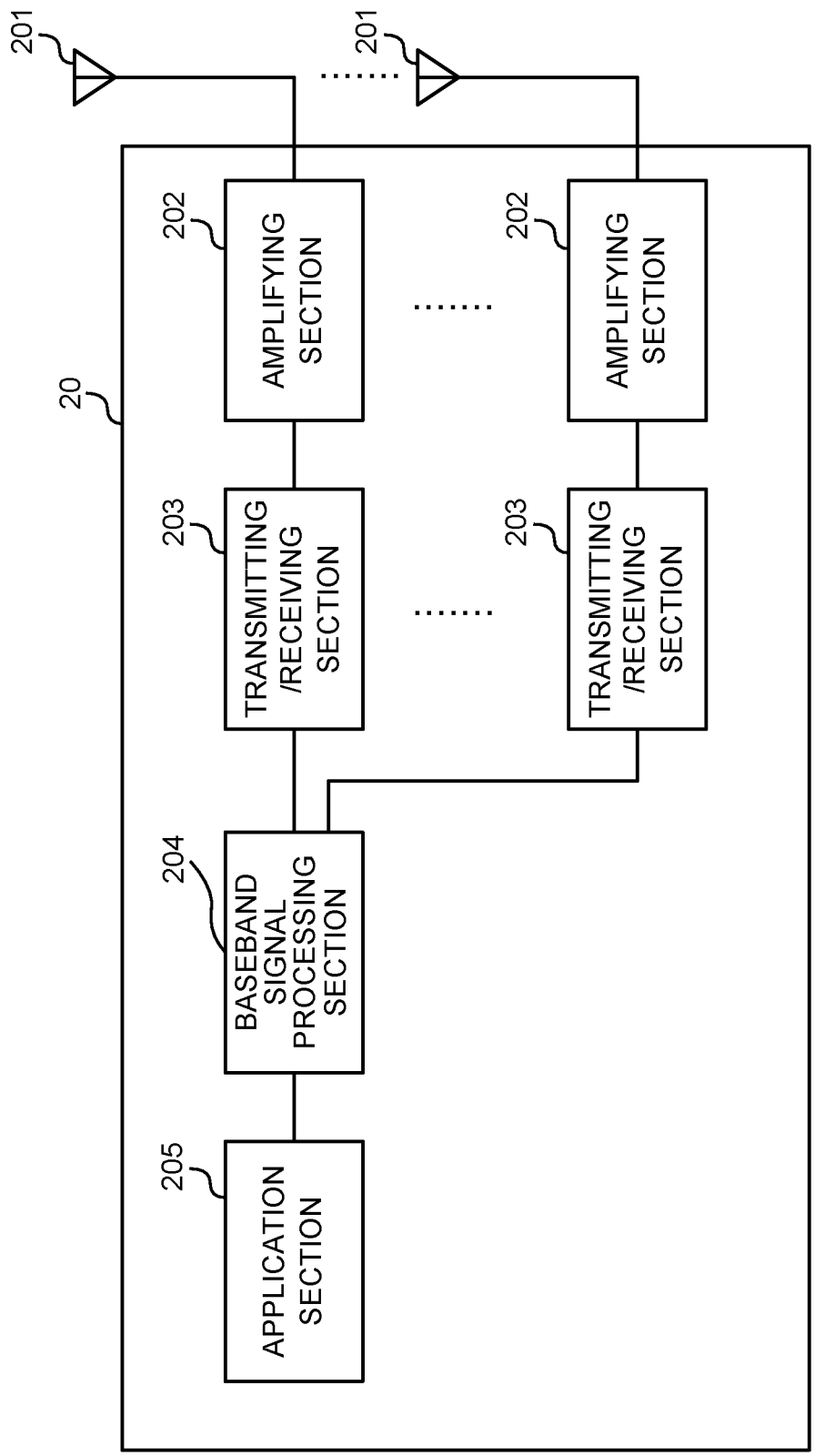
FIG. 11 is a diagram to show an example of an overall structure of a user terminal according to the present embodiment.

FIG. 11 is a diagram to show an exemplary overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205. The user terminal 20 may be "transmitting apparatus" in UL and "receiving apparatus" in DL.

Radio frequency signals that are received in multiple transmitting/receiving antennas 201 are amplified in the amplifying sections 202. The transmitting/receiving sections 203 receive DL signals amplified in the amplifying sections 202. The received signals are subjected to frequency conversion and converted into the baseband signal in the transmitting/receiving sections 203, and output to the baseband signal processing section 204.

The baseband signal processing section 204 performs, for the baseband signal that is input, an FFT process, error correction decoding, a retransmission control receiving process and so on. The DL data is forwarded to the application section 205. The application section 205 performs processes related to higher layers above the physical layer and the MAC layer.

Meanwhile, UL data is input from the application section 205 to the baseband signal processing section 204. The baseband signal processing section 204 performs at least one of transmission processes for retransmission control (for example, an HARQ transmission process), channel coding, rate matching, puncturing, a discrete Fourier transform (DFT) process, an IFFT process and so on, and the result is forwarded to each transmitting/receiving section 203. UCI (including, for example, at least one of an A/N in response to a DL signal, channel state information (CSI) and a scheduling request (SR), and/or others) is also subjected to at least one of channel coding, rate matching, puncturing, a DFT process, an IFFT process and so on, and the result is forwarded to the transmitting/receiving sections 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 receive DL signals (for example, at least one of DCI (including at least one of DL assignment, UL grant, and common DCI) DL data (channel), reference signals and higher layer control information) and/or transmit UL signals (for example, at least one of UL data (channel), UCI, reference signals and high layer control information).

To be more specific, the transmitting/receiving sections 103 may transmit DL data channels (for example, PDSCH) in transmission periods of variable length (for example, slots, mini-slots, a predetermined number of symbols, and so on), and/or receive UL data channels (for example, PUSCH).

A transmitting/receiving section 203 can be constituted by a transmitter/receiver, a transmitting/receiving circuit or transmitting/receiving apparatus that can be described based on general understanding of the technical field to which the present invention pertains. Furthermore, a transmitting/receiving section 203 may be structured as one transmitting/receiving section, or may be formed with a transmitting section and a receiving section.

Figure 12:
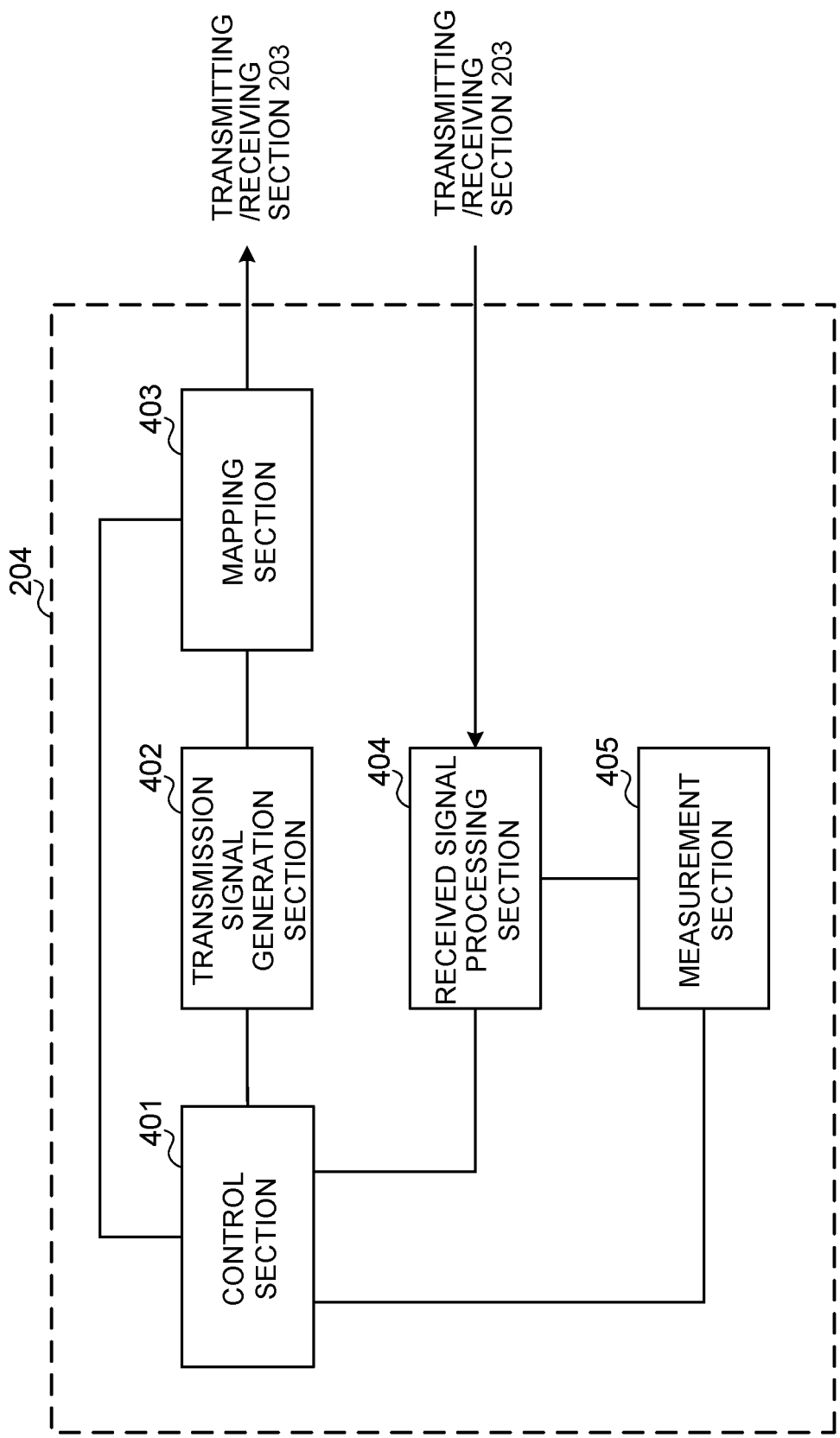
FIG. 12 is a diagram to show an example of a functional structure of a user terminal according to the present embodiment.

FIG. 12 is a diagram to show an exemplary functional structure of a user terminal according to the present embodiment. Note that, although FIG. 12 primarily shows functional blocks that pertain to characteristic parts of the present embodiment, the user terminal 20 has other functional blocks that are necessary for radio communication as well. As shown in FIG. 12, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, generation of UL signals in the transmission signal generation section 402, mapping of UL signals in the mapping section 403, DL signal receiving processes in the received signal processing section 404, and measurements in the measurement section 405 and so on.

To be more specific, the control section 401 may monitor (blind-decode) a DL control channel and detect DCI that schedules data channels for the user terminal 20. The control section 401 may control the receipt of a DL data channel based on this DCI. Also, the control section 401 may control the transmission of a UL data channel based on this DCI.

The control section 401 also controls the allocation of a reference signal (for example, DMRS) that is used to demodulate a data channel (which may be DL data channel or a UL data channel). To be more specific, the control section 401 may determine the allocation pattern (for example, the DMRS pattern) for this reference signal in the frequency direction and/or the time direction based on the number of symbols (transmission period) in which the data channel is transmitted.

Also, the control section 401 may determine the size of a precoding resource block group (PRG), in which the reference signal is allocated by using the same allocation pattern, based on the number of symbols (transmission period) in which the data channel is transmitted (first example and FIG. 5).

Also, the control section 401 may determine the size of a PRG based on at least one of the type of resource allocation (RA) that is applied to the data channel, the RBG size, the number of RBGs in the BWP, and the transmission bandwidth (first example). In addition, the control section 401 may control the allocation pattern of the reference signal in the PRG.

For example, if resources are allocated to the data channel based on the first RA type, the control section 401 may determine the PDG size based on the RBG size (FIG. 3). Also, when resources are allocated to the data channel based on the second RA type, the control section 401 may determine the PRG size based on the transmission bandwidth (FIG. 4).

In addition, the control section 401 may determine the allocation density of the reference signal in the frequency direction and/or the time direction as the allocation pattern of the reference signal, based on the number of symbols (transmission period) in which this data channel is transmitted (the second example, FIG. 6 and FIG. 7).

In addition, the control section 401 may determine the allocation pattern (for example, DMRS pattern) of the reference signal based on the number of symbols (transmission period) in which the data channel is transmitted and/or the bandwidth scheduled for the data channel (transmission bandwidth) (third example).

In addition, the control section 401 may determine the allocation pattern (for example, the DMRS pattern) for the reference signal based on higher layer signaling (for example, RRC signaling) and/or L1 signaling (for example, DCI) (third example).

The control section 401 can be constituted by a controller, a control circuit or control apparatus that can be described based on general understanding of the technical field to which the present invention pertains.

The transmission signal generation section 402 generates retransmission control information for UL signals and DL signal based on commands from the control section 401 (by performing, for example, coding, rate matching, puncturing and modulation) and outputs these to the mapping section 403. The transmission signal generation section 402 can be constituted by a signal generator, a signal generating circuit or signal generating apparatus that can be described based on general understanding of the technical field to which the present invention pertains.

The mapping section 403 maps the UL signals generated in the transmission signal generation section 402 to radio resources, as commanded from the control section 401, and outputs these to the transmitting/receiving sections 203. For example, the mapping section 403 maps reference signals to predetermined radio resources in allocation patterns determined by the control section 401.

The mapping section 403 can be constituted by a mapper, a mapping circuit or mapping apparatus that can be described based on general understanding of the technical field to which the present invention pertains.

The received signal processing section 404 performs receiving processes of DL signals (including, for example, at least one of demapping, demodulation and decoding). For example, the received signal processing section 404 may demodulate a DL data channel by using a reference signal provided in an allocation pattern determined by the control section 401.

Also, the received signal processing section 404 may output the received signals and/or the signal after the receiving process to the control section 401 and/or the measurement section 405. The received signal processing section 404 outputs, for example, higher layer control information to be sent in higher layer signaling, L1/L2 control information (for example, UL grant and/or DL assignment) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CRS and/or CSI-RS) from the radio base station 10, and outputs the measurement results to the control section 401. Note that the channel state measurements may be conducted per CC.

The measurement section 405 Can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 13:
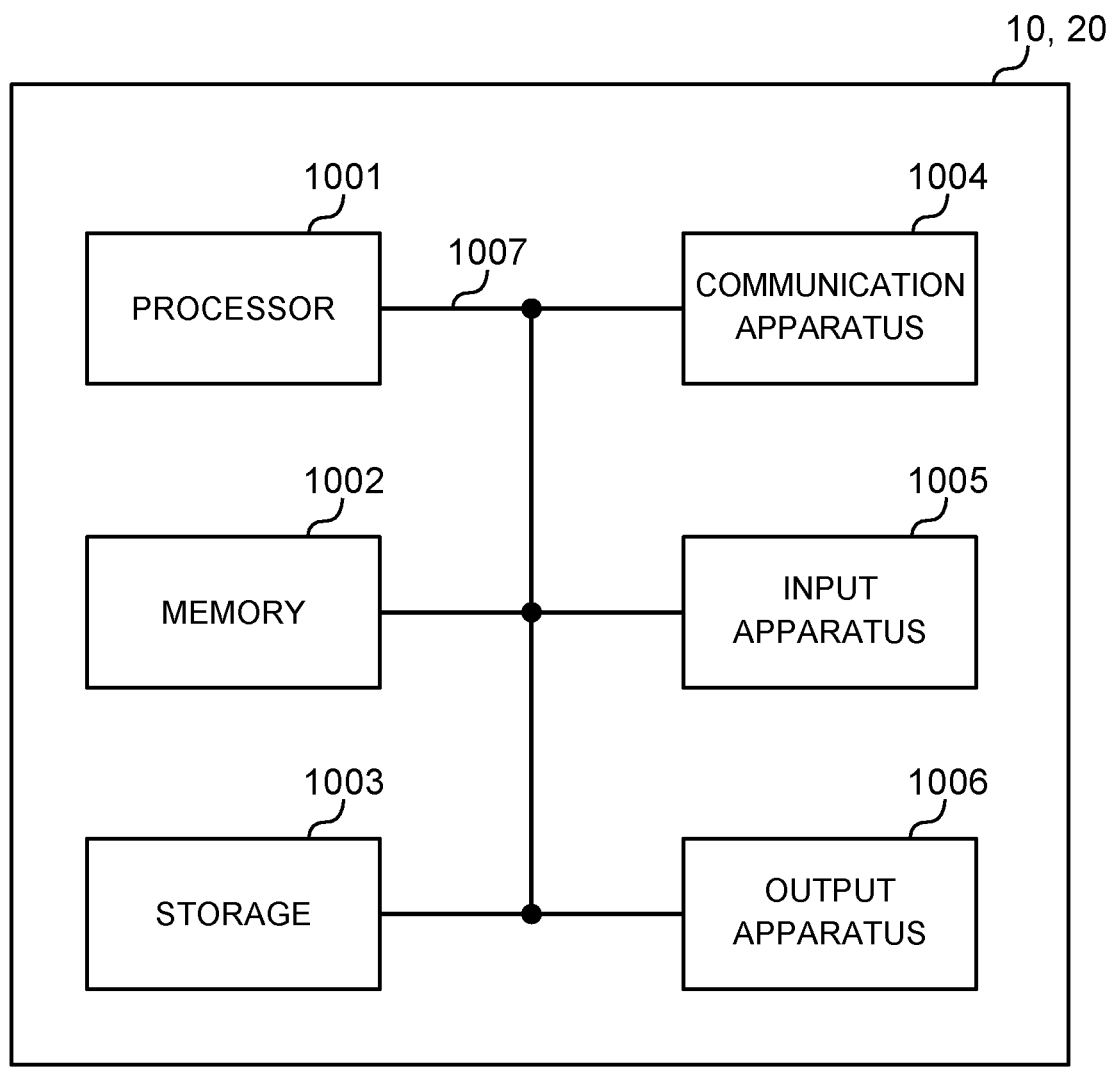
FIG. 13 is a diagram to show an example hardware structure of a radio base station and a user terminal according to the present embodiment.

That is, a radio base station, a user terminal and so on according to an embodiment of the present invention may function as a computer that executes the processes of the radio communication method of the present invention. FIG. 13 is a diagram to show an exemplary hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read predetermined software (programs), thereby allowing the processor 1001 to do calculations, the communication apparatus 1004 to communicate, and the memory 1002 and the storage 1003 to read and write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Also, each device shown in FIG. 13 is connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) not dependent on the numerology.

A slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain.

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval (TTI)," or a plurality of consecutive subframes may be referred to as a "TTI," or one slot or mini-slot may be referred to as a "TTI." That is, a subframe and/or a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the allocation of radio resources (such as the frequency bandwidth and/or the transmission power that can be used by each user terminal)

for each user terminal in TTI units. Note that the definition of TTIs is not limited to this. TTIs may be transmission time units for channel-encoded data packets (transport blocks), or may be the unit of processing in scheduling and/or link adaptation and so on. Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI" (or a "fractional TTI"), a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe may be each comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots included in a subframe or a radio frame, the number of mini-slots included in a slot, the number of symbols included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a structure in which communication between a radio base station and a user terminal is replaced with communication among a plurality of user terminals (D2D (Device-to-Device)). In this case, user terminals 20 may have the functions of the radio base stations 10 described above. In addition, "uplink" and/or "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and optical regions (both visible and invisible).

When terms such as "include," "comprise" and other variations of these terms are used in this specification or in claims, such terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a receiver that receives downlink control information indicating a transmission bandwidth allocated to a downlink shared channel within a bandwidth part; and
   a processor that determines a size of a precoding resource block group (PRG), to which a same precoding is applied, based on the transmission bandwidth or a subset of the transmission bandwidth,
   wherein the processor does not expect that the transmission bandwidth includes non-contiguous resource blocks,
   wherein the processor determines the size of the PRG based on a number of resource blocks included in the bandwidth part, and
   wherein the PRG includes one or more resource blocks.

2. A radio communication method for a terminal comprising:
   receiving downlink control information indicating a transmission bandwidth allocated to a downlink shared channel within a bandwidth part; and
   determining a size of a precoding resource block group (PRG), to which a same precoding is applied, based on the transmission bandwidth or a subset of the transmission bandwidth,
   wherein the terminal does not expect that the transmission bandwidth includes non-contiguous resource blocks,
   wherein the terminal determines the size of the PRG based on a number of resource blocks included in the bandwidth part, and
   wherein the PRG includes one or more resource blocks.

3. A base station comprising:
   a transmitter that transmits downlink control information indicating a transmission bandwidth allocated to a downlink shared channel within a bandwidth part; and
   a processor that determines a size of a precoding resource block group (PRG), to which a same precoding is applied, based on the transmission bandwidth or a subset of the transmission bandwidth,
   wherein the processor does not expect that the transmission bandwidth includes non-contiguous resource blocks,
   wherein the processor determines the size of the PRG based on a number of resource blocks included in the bandwidth part, and
   wherein the PRG includes one or more resource blocks.

4. A system comprising a terminal and a base station, wherein:
   the terminal comprises:
     a receiver that receives downlink control information indicating a transmission bandwidth allocated to a downlink shared channel within a bandwidth part; and
     a first processor that determines a size of a precoding resource block group (PRG), to which a same precoding is applied, based on the transmission bandwidth or a subset of the transmission bandwidth,
   the base station comprises:
     a transmitter that transmits the downlink control information; and
     a second processor that determines the size of the PRG, to which the same precoding is applied, based on the transmission bandwidth or the subset of the transmission bandwidth,
   wherein the first processor does not expect that the transmission bandwidth includes non-contiguous resource blocks,
   wherein the first processor determines the size of the PRG based on a number of resource blocks included in the bandwidth part, and
   wherein the PRG includes one or more resource blocks.

* * * * *